United States Patent [19]
Parker

[11] 4,066,356
[45] Jan. 3, 1978

[54] ANTI-BACKLASH MEANS FOR ADJUSTING ENLARGERS

[75] Inventor: John C. Parker, Los Angeles, Calif.

[73] Assignee: Vivitar Corporation, Santa Monica, Calif.

[21] Appl. No.: 730,375

[22] Filed: Oct. 7, 1976

[51] Int. Cl.$^2$ .................. G03B 27/52; F16B 55/18
[52] U.S. Cl. ........................................ 355/63; 74/409; 74/422
[58] Field of Search ............... 355/58, 59, 60, 62, 355/63; 74/409, 422, 498

[56] References Cited
U.S. PATENT DOCUMENTS

| | | | |
|---|---|---|---|
| 2,472,907 | 6/1949 | Kolesnikoff | 355/62 |
| 2,548,603 | 4/1951 | Hallstrand | 74/409 |
| 3,361,002 | 1/1968 | Stachlin | 74/409 |

Primary Examiner—L. T. Hix
Assistant Examiner—M. L. Gellner
Attorney, Agent, or Firm—Lyon & Lyon

[57] ABSTRACT

An anti-backlash means, particularly adapted for photographic enlargers including a channel shaped optical bench having a pair of guideways; a frame movable along the guideways, having a pair of tracks, a pair of rack elements, and leaf springs supporting the rack elements in continuous relation; a gear rotatably supported by the optical bench including a pair of gear elements engageable with the rack elements, and wheels riding on the tracks to maintain a fixed minor spacing between the pitch plane of the rack elements at the pitch radius of the gear elements; either the gear elements or the rack elements having offset teeth to eliminate backlash.

6 Claims, 6 Drawing Figures

ANTI-BACKLASH MEANS FOR ADJUSTING ENLARGERS

BACKGROUND AND SUMMARY

The utilization of a pair of gears or a pair of racks with offset teeth have been used to minimize backlash; however, devices of this type have been complicated. The present invention is directed to an anti-backlash means, particularly adapted for photographic enlargers, and a primary object is to provide an anti-backlash device having a minimal number of parts which may be readily molded, and readily installed.

A further object is to provide an anti-backlash device wherein a pair of rack elements are supported in a frame integral therewith, in such a manner as to have limited displacement so as to maintain pressure contact with an opposing drive gear and either the rack elements or the drive gear may be provided with offset teeth to prevent backlash.

A further object is to provide an anti-backlash rack and drive gear assembly wherein the drive gear is supported on tracks parallel to the racks by means of wheels having a diameter corresponding precisely to the pitch diameter of the drive gear.

DETAILED DESCRIPTION

Figure 1:
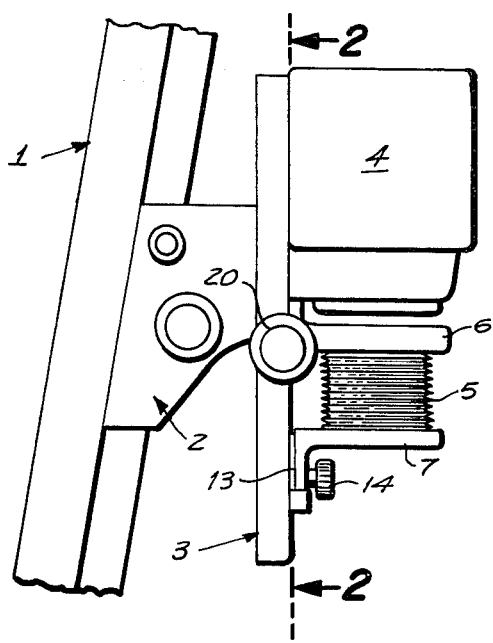
FIG. 1 is a fragmentary side view of a photograph enlarger having an anti-backlash means.

A photographic enlarger arranged to utilize the anti-backlash means is carried by an inclined box beam column 1 indicated fragmentarily in FIG. 1 on which is mounted a vertically head support carriage 2 which supports an optical bench 3 by means of a pivot shaft, not shown. The anti-backlash means is incorporated in the optical bench 3. Secured to the optical bench 3 is an enlarger head 4 and a bellows 5 containing appropriate optical means, not shown. Above the bellows 5 is a negative carrier stage 6 which is fixed to the supporting optical bench 3. Below the bellows is a tilting lens stage 7.

The optical bench 3 is in the form of a channel member which includes a base web 8, longitudinally extending side flanges 9 and longitudinally extending guide flanges 10 disposed between the side flanges 9 and extending from the base web 8. The guide flanges include confronting sides which are provided with guide grooves 11. The optical bench 3 including the web 8, side flanges 9 and guide flanges 10 are formed as a single piece extension.

Figure 2:
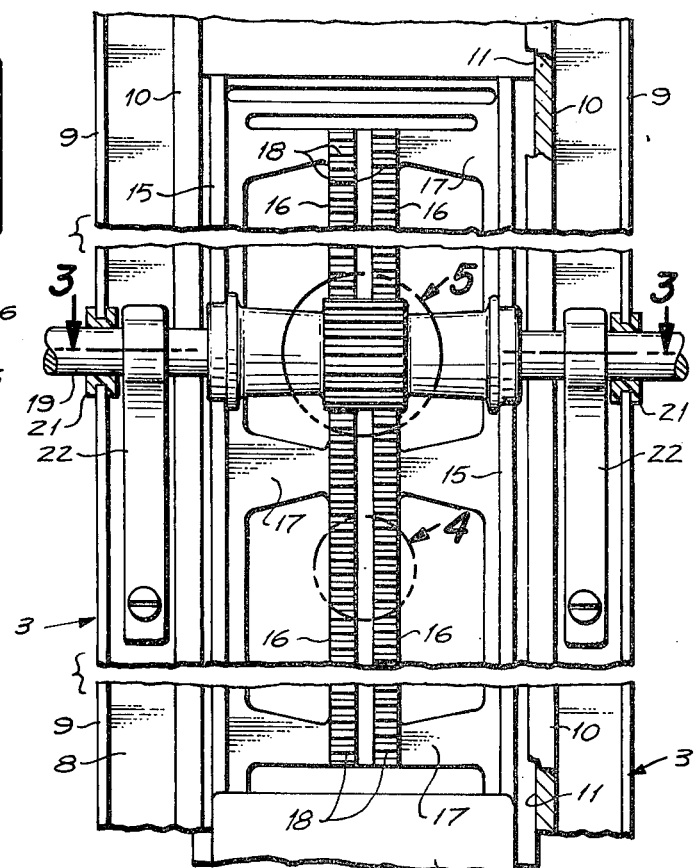
FIG. 2 is an enlarged fragmentary front view of the anti-blacklash means.

Slidably received between the guide grooves 11 is a rack carrier frame 12. Provided at the lower portion of the rack carrier frame is a mounting pad 13, shown fragmentarily in FIG. 2, which is removably attachable to the tilting lens stage 6 by a screw knob 14 indicated in FIG. 1. The rack carrier frame 12 is provided with a pair of longitudinally extending ribs which form wheel tracks 15. Centered between the tracks 15 is a pair of racks 16 in parallel, juxtaposed position. Each rack is connected to the corresponding lateral sides of the carrier frame by leaf springs 17.

The rack carrier frames, mounting pad 13, tracks 15, racks 16 and springs 17 constitute a single piece integral structure preferably injection molded of plastic material. The racks 16 are provided with offset teeth 18 utilized to eliminate backlash.

Extending transversely with respect to the optical bench 3 is a drive shaft 19 having knobs 20 at its opposite extremities. The drive shaft is received in channel bearings at 21 provided in the side flanges 9 of the supporting optical bench 3 and are retained therein by means of leaf springs 22 secured to the base web 8. The drive shaft 19 is provided with a knurled center portion at 23 on which is secured a drive gear 24 flanked by spools 25 having wheels 26 which are provided with flanges 27.

The wheels 26 ride on the tracks 15 and serve to fix the position of pitch diameter of the drive gear 24 with respect to the two racks 16. The amount of offset of the teeth 18 of the two racks is such as to compensate fully for any backlash that might otherwise occur. In addition, the rack supporting springs 17 and the shaft retainer springs 22 exert yieldable forces in opposite direction to maintain a fully compensated anti-backlash drive as the knobs 20 are turned manually, the wheels 26, however, preventing the teeth to be interengaged beyond the pitch radius of the gears, and pitch plane of the rack elements.

Figure 5:
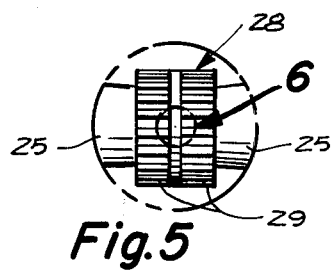
FIG. 5 is a side view of a modified form of drive gear taken within Circle 5 of FIG. 2.
Figure 3:
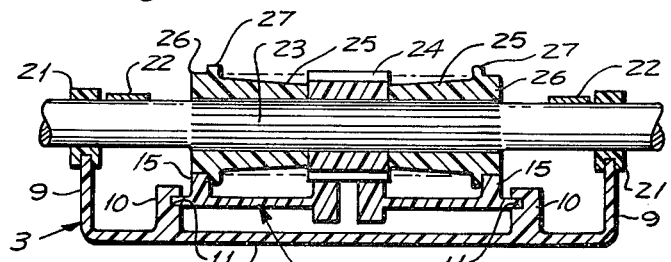
FIG. 3 is a transverse sectional view taken through 3—3 of FIG. 2.
Figure 6:
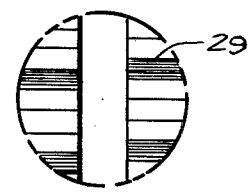
FIG. 6 is a further enlarged fragmentary view of the gear piece, as modified, taken within Circle 6 of FIG. 5.
Figure 4:
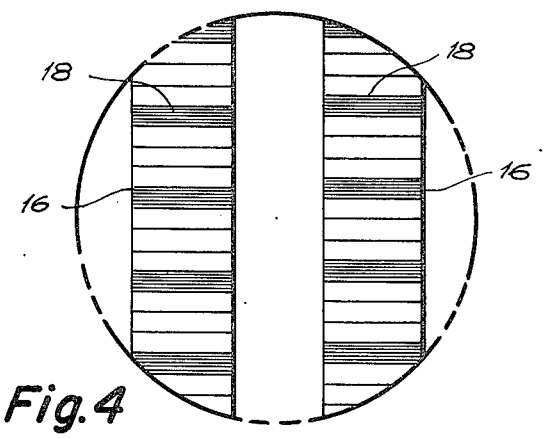
FIG. 4 is a further enlarged elevational view of the rack means taken within Circle 4 of FIG. 2.

While a single drive gear 24 is used, the teeth of the drive gear actually function as two separate gears in axial alignment. Anti-backlash operation may also be obtained by arranging the teeth of the two racks 16 in aligned relation in which case a drive gear 28 is utilized having two sets of teeth 29 which are offset as shown in FIGS. 5 and 6.

Having fully described my invention it is to be understood that I am not to be limited to the details herein set forth, but that my invention is of the full scope of the appended claims.

I claim:
1. A rack and gear drive, comprising:
    a. an essentially planar carrier frame including opposed side margins, a pair of adjacent parallel disposed rack elements, and yieldable elements integrally connecting each rack element to a corresponding side margin to permit limited movement of each rack element in a direction essentially perpendicular to the carrier frame;
    b. a supporting means receiving the side margins of the carrier frame for longitudinal movement of the rack elements;
    c. a drive shaft carried by the supporting means;
    d. and gear means carried by the shaft for engagement with the rack elements.
2. A rack and gear drive, comprising:
    a. an essentially planar carrier frame including opposed side margins, a pair of adjacent parallel disposed rack elements, and yieldable elements integrally connecting each rack element to a corresponding side margin to permit limited movement of each rack element in a direction essentially perpendicular to the carrier frame;

b. a supporting means receiving the side margins of the carrier frame for longitudinal movement of the rack elements;
c. a drive shaft carried by the supporting means;
d. a gear means carried by the shaft for engagement with the rack elements;
e. the carrier frame further including adjacent its side margins a pair of tracks; and
f. a pair of wheels having an effective diameter corresponding to the pitch diameter of the gear means, rotatable on the tracks to maintain a predetermined spacing between the axis of the shaft and the rack elements.

3. An anti-backlash means, comprising:
a. a supporting means having opposed guide flanges;
b. a carrier frame defining a plane and including side margins fitting the guide flanges for longitudinal movement relative to the supporting means;
c. a pair of rack elements disposed longitudinally in the central region of the carrier frame and a plurality of yieldable elements connecting each rack element to a corresponding side of the carrier frame to permit limited displacement with respect to the plane defined by the carrier frame;
d. a drive shaft disposed over the carrier frame in transverse relation thereto;
e. a gear having portions forming a pair of drive gear elements mounted on the shaft and engagable with the racks;
f. one pair of said elements having teeth offset a preselected amount and arranged, when yieldably pressed between the teeth of said other pair of elements, to compensate for backlash;
g. a pair of tracks disposed longitudinally at opposite sides of the carrier frame;
h. and a pair of wheels carried by the shaft, the wheels having a diameter corresponding to the pitch diameter of the gear elements to limit intermeshing of the gear and rack elements.

4. An anti-backlash means as defined in claim 3, wherein:
a. the teeth of said rack elements are offset.

5. An anti-backlash means as defined in claim 3, wherein:
a. the teeth of said gear elements are offset.

6. An anti-backlash means as defined in claim 3, wherein:
a. the supporting means is a channel member having side flanges disposed laterally outward from the guide flanges, the side flanges having means for journalling the shaft.

* * * * *